United States Patent [19]
Payne

[11] Patent Number: 6,115,131
[45] Date of Patent: Sep. 5, 2000

[54] EMBEDDED DISPLAY LIST INTERPRETER FOR MULTIPROCESSOR-BASED PRINTER

[75] Inventor: Ralph E. Payne, Dallas, Tex.

[73] Assignee: Texas Instruments Incorporated, Dallas, Tex.

[21] Appl. No.: 08/902,709

[22] Filed: Jul. 30, 1997

Related U.S. Application Data

[60] Provisional application No. 60/024,795, Jul. 31, 1996.

[51] Int. Cl.[7] .................................................. G06K 15/00
[52] U.S. Cl. ..................... 358/1.14; 358/1.01; 358/1.12; 358/1.17; 358/448; 358/453; 345/502; 345/505; 712/39
[58] Field of Search .................................... 395/114, 101, 395/112, 117, 391, 553, 670–672, 677; 358/448, 453, 1.01, 1.12, 1.17; 345/502, 505; 712/39

[56] References Cited

U.S. PATENT DOCUMENTS

| | | | |
|---|---|---|---|
| 4,949,280 | 8/1990 | Littlefield | 364/518 |
| 5,420,941 | 5/1995 | Capo et al. | 382/553 |
| 5,768,489 | 6/1998 | Adachi et al. | 395/117 |
| 5,809,288 | 9/1998 | Balmer | 395/553 |

FOREIGN PATENT DOCUMENTS

0599318A2  9/1993  European Pat. Off. .

*Primary Examiner*—Mark R. Powell
*Assistant Examiner*—Lance W. Sealey
*Attorney, Agent, or Firm*—Charles A. Brill; Wade James Brady, III; Frederick J. Telecky, Jr.

[57] ABSTRACT

A processing unit for a printer system. The processing unit is comprised of a master processor and multiple parallel processors. The master processor builds the display list from a page description program or from some other graphics programming. It partitions the display list into sublists and distributes the sublists to the parallel processors. The parallel processors interpret the sublists, thereby rendering the image as bitmapped data.

17 Claims, 2 Drawing Sheets

EMBEDDED DISPLAY LIST INTERPRETER FOR MULTIPROCESSOR-BASED PRINTER

This application claims priority under 35 U.S.C. § 119 (e) (1) of provisional application number 60/024,795, filed Jul. 31, 1996.

TECHNICAL FIELD OF THE INVENTION

This invention relates generally to printing, and more particularly to a method of processing a display list representing the image, such that the image is rendered as bitmapped data.

RELATED PATENT APPLICATIONS

This patent application is related to the following patent applications, each assigned to Texas Instruments Incorporated:

U.S. patent application Ser. No. 08/951,021 (Atty Dkt No. TI-21734), entitled "Pattern Filling for Processor-Based Printer"; U.S. patent application Ser. No. 08/941, 871 (Atty Dkt No. TI-21872), entitled "Screening Method for a Single Chip Multiprocessor";

U.S. patent application Ser. No. 08/900,896 (Atty Dkt No. TI-22009), entitled "Managing Interpreter Cofunctions on Multiprocessor-Based Printer"; and U.S. patent application Ser. No. 08/956,402 (Atty Dkt No. TI-23781), entitled "Reduced Instruction Processing on a Multiprocessor".

BACKGROUND OF THE INVENTION

Modern electrophotographic printers typically use some sort of processor to interpret a program representing the image to be printed. The program is written in some sort of graphical description language. The interpretation usually involves conversion of the program into machine executable instructions, such as a display list. These instructions are subsequently used to create a bitmap, which determines a pattern of light that will expose a photosensitive drum. The exposure of the drum results in a charge pattern on the drum. The drum rotates past a toner dispenser and attracts toner particles to the drum's surface corresponding to the charge pattern. The drum transfers the toner to a print medium such as a piece of paper. The toner is fused to the paper, usually with heat, and the paper exits the printer.

The exposure unit that provides the pattern of light for exposing the drum can be comprised of a laser-scanning device or a spatial light modulator. Spatial light modulators are becoming the technology of choice for full color, high resolution printing at increasingly faster speeds. As printer hardware improves, methods for providing faster image data processing are also needed.

SUMMARY OF THE INVENTION

One aspect of the invention is a processing unit for a printer, for processing a display list representing an image to be printed. A master processor is programmed to partition said display list into sublists, each sublist representing a different portion of the image, and to distribute said sublists to parallel processors such that each parallel processor receives a different sublist. The parallel processors are programmed to execute said sublists simultaneously, thereby creating bitmapped data. The master processor and parallel processors can be components of a single multiprocessor device having shared memory for interpreter code and parameters. The master processor can be further programmed so that it is capable of receiving high level graphic description programming and interpreting that programming into the display list.

An advantage of the invention is that it frees the main printer processor from display list processing. The master processor need only build and partition the display lists and distribute them to the parallel processors. Apart from these tasks, the master processor is free to do other useful work. Because the master processor hands off sublists to the parallel processors rather than schedule each instruction separately, the master processor's workload is greatly reduced.

BRIEF DESCRIPTION OF THE DRAWINGS

FIG. 3 illustrates how a display list may be partitioned by dividing a page into bands.

DETAILED DESCRIPTION OF THE INVENTION

For purpose of example, the following description is in terms of printer systems that use a spatial light modulator (SLM) to expose a photosensitive drum. The specific SLM device is a digital micro-mirror device (DMD). However, the same concepts could apply to printer systems that use other types of exposure systems, such as scanned laser exposure systems, and that use other types of transfer modes. In general, the invention is useful for any printer system that processes a display list to provide a bitmap of an image.

One aspect of the invention is to a processing unit for interpreting graphic description programming. The processing unit has a master processor and a number of parallel processors. The master processor receives the programming, such as a program in a page description language, and converts the program into a display list. The master processor then partitions the display list into sublists, which it distributes to the parallel processors. The parallel processors simultaneously convert their respective sublists into bitmapped data and inform the master processor when they are ready for a next sublist. They continue processing sublists until all sublists of the image are processed.

In a very general sense, both the master processor and the parallel processors run "interpreters", with the master processor being programmed to convert high level programming to machine executable instructions, such as a display list, and the parallel processors being programmed to convert the instructions into bitmapped data. The interpretation process is also sometimes referred to as "scan conversion", a term which has been carried over to SLM-based printers even though they do not scan a beam of light. The process of converting instructions into bitmapped data is also referred to as "rasterization" or "rendering" the image. The "bitmap" is the representation of the image on a pixel-by-pixel basis, and may use grayscale or color values for each pixel. In the case of an SLM, the exposure module may include hardware for converting the bitmapped data into binary exposure data.

Figure 1:
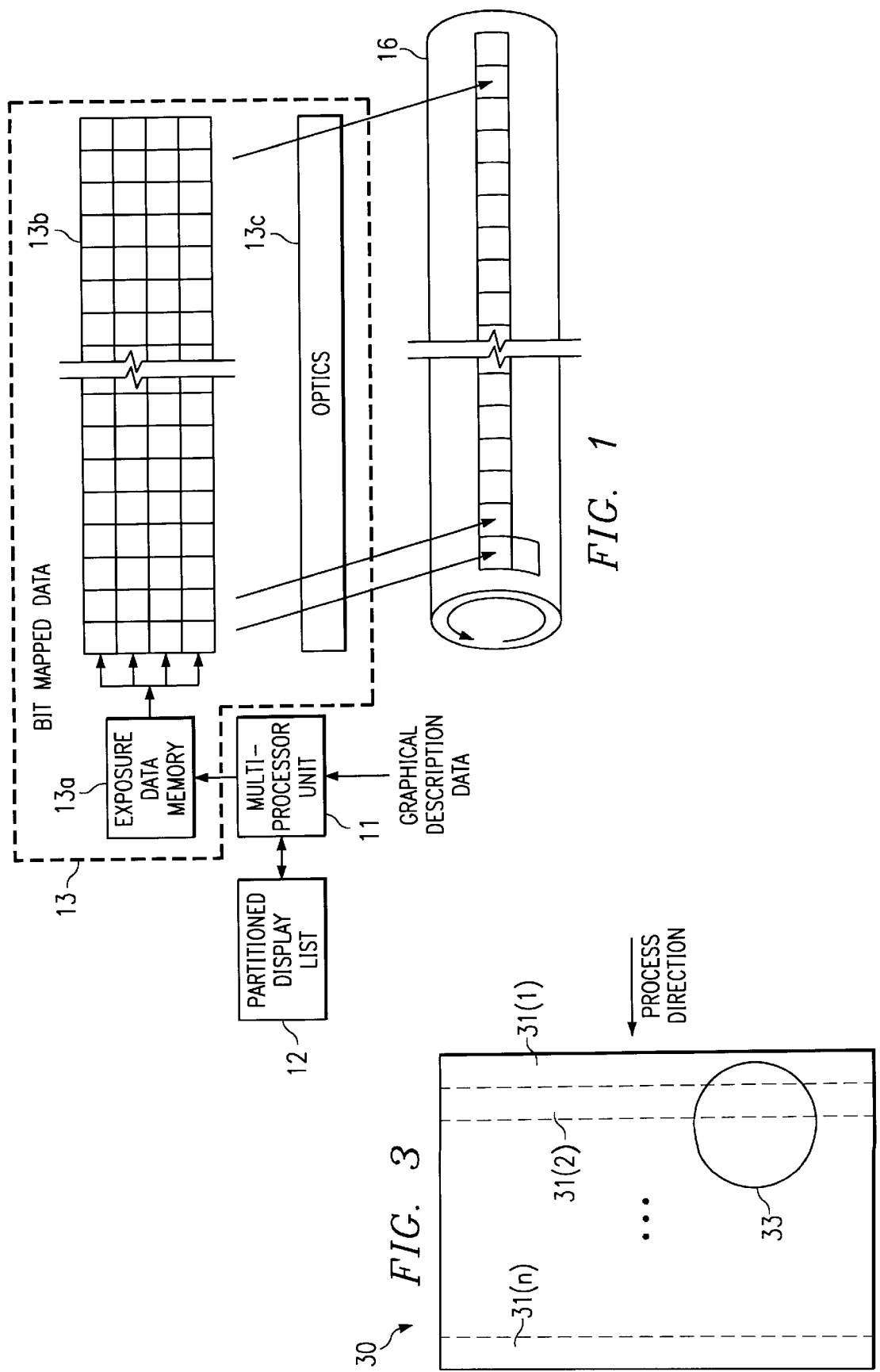
FIG. 1 illustrates portions of an electrophotographic printer, having a multiprocessor unit in accordance with the invention.

FIG. 1 illustrates portions of a printer system relevant to the invention, namely a multiprocessor unit (MPU) 11, a display list memory 12, an exposure unit 13 having a bitmap memory 13a, an SLM 13b, and optics 13c, and a photosensitive drum 16. MPU 11 is configured and programmed in accordance with the present invention, as described below.

The basic structure and operation of a suitable SLM-based exposure unit 13 and drum 16 are known in the art of electrophotographic printing. Basically, the exposure of drum 16 is accomplished with SLM 13b, which has an array of light-reflecting or light-generating elements. As stated above, in the example of this description, the SLM is a DMD, which has an array of light-reflecting micromirrors. Each micromirror is electronically controlled to tilt to an on or off position to form an image. Grayscale images are achieved by modulating the intensity, the duration, or the spot size of the exposure.

An example of a printer system, having a DMD-based exposure unit, with which the invention may be used, is described in U.S. Pat. No. 5,041,851, entitled "Spatial Light Modulator Printer and Method of Operation", to W. E. Nelson. Various methods of operating an SLM to provide grayscale images are described in U.S. Pat. No. 5,461,410, entitled "Gray Scale Printing Using Spatial Light Modulators", to J. M. Florence, et al., and in U.S. Pat. No. 5,461,411, entitled "Process and Architecture for Digital Micromirror Printer", to V. Venkateswar, et al. Each of these patents is assigned to Texas Instruments Incorporated and each is incorporated by reference herein.

MPU 11 receives graphic description data for the image to be printed, such as programming in a page description language. As explained below, MPU 11 interprets the programming and provides bitmapped data that determines which mirrors will be on or off at any given time.

For purposes of providing a simple example, SLM 13b is illustrated as having only 4 rows of light-reflecting micromirrors. In practical applications, SLM 13b may have more rows and will have many columns. A typical SLM 13 might have 1000 or more elements per row. Light from a light source (not shown) is reflected by SLM 13b onto drum 16, in accordance with the "on" or "off" state of each micromirror. This state is determined by data delivered from an exposure data memory 13a. As explained below, memory 13a delivers one bit of data for each element to be addressed during a single line period, and may include look up tables or other hardware for converting the bitmapped data to binary form.

The image is reflected from SLM 13b and focused through an optics unit 13c. As shown in FIG. 1, light from SLM 13b falls onto drum 16, with each mirror providing light for one pixel on the image. Only one line of pixels is explicitly illustrated, it being understood that many lines of pixels are simultaneously illuminated by SLM 13b. Each pixel is either exposed or not, and thereby either charged or discharged for toner attraction. Two typical sizes for such pixels are $\frac{1}{300}$ of an inch square and $\frac{1}{600}$ of an inch square. The drum 16 will then rotate over the paper to be printed and the toner will be transferred from the drum 16 and fused to the paper, the line of pixels printing a line on the paper.

Figure 2:
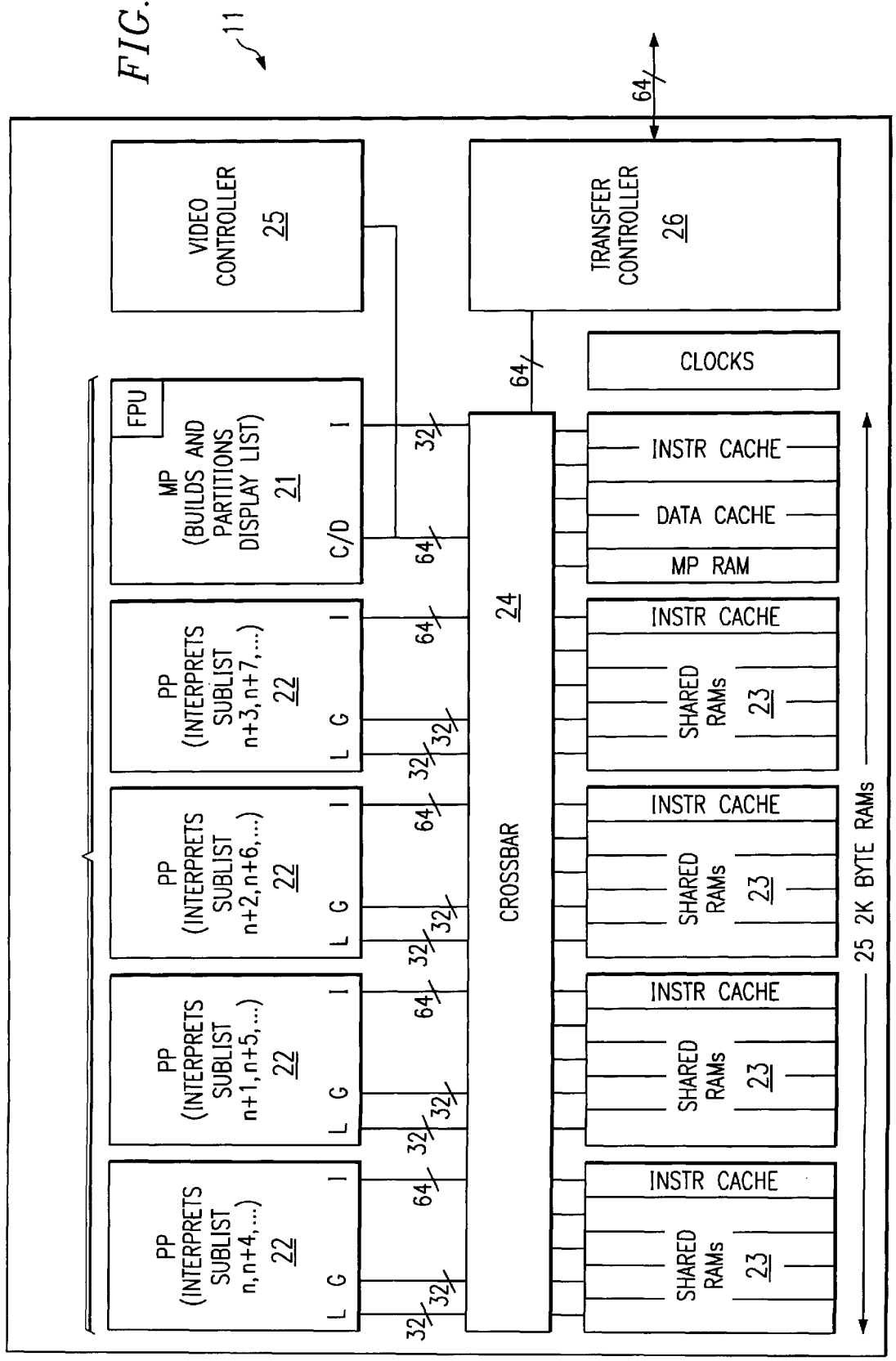
FIG. 2 illustrates the multiprocessor unit of FIG. 1.

FIG. 2 is a block diagram of MPU 11, configured for display list processing in accordance with the invention. A suitable MPU 11 is the TMS320C80 MVP, manufactured by Texas Instruments Incorporated. Other MPUs having similar characteristics could be substituted. MPU 11 can be a single-chip device, such as is the MVP, or can be comprised of multiple components.

In addition to the structural characteristics described below, an important functional characteristic of MPU 11 is the ability to interpret a high level graphic description program representing high-resolution full-color images at acceptable speeds. To this end, the MVP is capable of performing 2 billion RISC-like operations per second (BOPs). The internal data memory transfer bandwidth is 2.4 Gbytes per second and the external data transfer bandwidth is 400 Mbytes per second.

MPU 11 has a master processor 21, a number of parallel processors 22, and RAM (random access memory) 23. All processors 21 and 22 are programmable. The processors 21 and 22 access RAM 23 via a crossbar switch 24. The crossbar switch 24 interconnects processors 21 and 22 in a manner such that different combinations of memory arrangements can be achieved as necessary for the particular operation.

The master processor 21 is a 32-bit RISC (reduced instruction set computer) processor with a floating point hardware unit (FPU). It has an instruction (I) port to access an instruction cache in RAM 23. It coordinates the processing by the parallel processors 22 and communicates with other components of the printer.

The parallel processors 22 are 32-bit integer units. Each parallel processor 22 has a global (G) and a local (L) port to access RAM 23, and an instruction (I) port to access an instruction cache in RAM 23. Each parallel processor 22 has two address generators, a three-input ALU, and a clock multiplier, all controlled with 64-bit instructions. The parallel processors 22 use a 64-bit instruction operation code. The instruction set is described primarily as an assembly language.

Transfer controller 26 is a direct memory access device, used for cache servicing and transferring blocks of data on or off multiprocessor unit 12.

RAM 23 is 50K bytes of single-cycle memory, divided into 25 2K-byte RAM units. Each processor 21 and 22 has one RAM unit partially dedicated to storing interrupt vectors addresses and specifying parameters to the transfer controller 26. Each parallel processor 22 has three data RAM units that any processor 21 or 22 can access as shared memory. Each parallel processor 22 has one instruction cache RAM unit and the master processor 21 has two instruction cache RAM units. These RAMs are managed by an instruction cache controller in each processor. The master processor 21 also has two RAM units for data, managed by a data cache controller.

Further details describing the MVP are set out in U.S. Pat. No. 5,212,777, entitled "Multi-Processor Reconfigurable in Single Instruction Multiple Data (SIMD) and Multiple Instruction Multiple Data (MIMD) Modes and Method of Operation", assigned to Texas Instruments Incorporated. Additional information is available in various MVP User's Guides (1995), published by and available from Texas Instruments Incorporated. These documents are incorporated by reference herein.

In operation, master processor 21 receives a program representing an image to be rendered. If the program is not already in display list form, master processor 21 interprets the program and builds a display list. This display list is a list of machine executable instructions (operation codes), each operation code having one or more parameters. The operation codes are the graphics primitives that will be used to render the image. For example, an operation code might represent an instruction to build a trapezoid, with the parameters specifying the dimensions. In the case of the MVP MPU 11, the operation codes are written in assembly language.

Master processor 21 partitions the display list into sublists. Each sublist represents a portion of the image, such as a block or a strip. In the example of this description, the partitioning is performed by dividing the image into "bands".

FIG. 3 illustrates how a display list is partitioned by dividing an image into bands. The image (page) 30 is divided into bands 31(1) . . . 31(n), which run in the cross process direction of printing. Each band 31 is represented by a corresponding portion of the display list, e.g., a sublist. A typical band 31 might correspond to a ½ inch strip of the page 30.

If an object in the image overlaps more than one partition, master processor 21 clips parameters as necessary so that the object may be rendered by executing more than one sublist. Referring again to FIG. 3, the image 30 has a circle 33 that overlaps more than one band. The parameters of the operation code representing the circle are clipped so that the circle's graphical representation may appear in different sublists.

After partitioning the display list, master processor 21 stores the partitioned display list in a display list memory 12. For each sublist, master processor 21 delivers, to an available parallel processor 22, a pointer to that sub list. The partitioning may be performed for an entire image so that the sublists are stored and distributed as the parallel processors 22 are ready for them, or the partitioning may be performed "on the fly".

Master processor 21 tracks the operation of the parallel processors 22. If a sublist will require more than one parallel processor 22, master processor 21 will allocate two parallel processors 22 to that sublist. This is true even if one of the parallel processors 22 will be used only part of the time that the other is being used. However, in general, display list algorithms can be modified so that sublists can be run on a single parallel processor 22.

Parallel processors 22 operate simultaneously, each interpreting a different sublist. Each parallel processor 22 is programmed to run its own interpreter. Typically, the interpreter is set up as a primitive table interpreter. Each parallel processor 22 reads and interprets its sublist, operation code by operation code. As the parallel processor 22 reads each operation code, it reads the associated parameters into a parameter RAM 23.

Once the parameter transfer has been made, the operation code is used to access the appropriate operation code body for that function. More specifically, each operation code represents an entry point to the assembly code that will be executed to render the image in bitmapped form, thus enabling the parallel processors 22 to vector to the location in memory that stores the code.

The operation code body interfaces to a sequential block of parameters in RAM 23. It receives a pointer to the head of that block in an address register or as an entry in a stack. The operation code body then reads the parameters and assigns them to registers as required. The result of the execution of the sublist is bitmap data corresponding to the sublist.

When the parameters are satisfied, control is returned to the parallel processor's interpreter, which accesses and executes the next operation code in the sublist. These actions are repeated until the sublist is exhausted, at which time the parallel processor's interpreter notifies master processor 21 that the parallel processor 22 is ready for another sublist, or to perform any other task it may be assigned.

A feature of the parallel processors 22 is that their interpreters can access display lists referenced by other display lists. For example, a sublist may have a special operation code with a field that identifies that operation code as a subroutine call. The parameters of this special operation code include the address of another display list in memory 12. The last element in the called list returns execution to the next operation code in the calling list.

The invention may be implemented on a MPU 11 with relative addressing of the parallel processors 22. This permits the same operation code body to run on different parallel processors 22 by calculating addresses in a manner such that each parallel processor 22 can access its own local RAM. This relative addressing is described in TMS320C80 (MVP) Parallel Processor User's Guide (1995), published by and available from Texas Instruments Incorporated and incorporated herein by reference.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A processing unit for a printer, operable to process a display list representing an image to be printed, comprising:
   a master processor for performing a plurality of operations, said operations including, but not limited to partitioning said display list into a plurality of sublists, each of said sublists representing a different separate band of said image, a band being defined as a strip of a page of predetermined width, and to distribute said sublists to parallel processors such that each of said parallel processors receives a different one of said sublists; and
   a plurality of parallel processors, said master processor selecting different ones of said parallel processors for receiving different ones of said sublists corresponding to said bands of said image, said selected parallel processors processing said different ones of said sublists simultaneously.

2. The processing unit of claim 1, wherein said master processor and said parallel processors are components of a single multiprocessor device.

3. The processing unit of claim 2, wherein said master processor and said parallel processor are connected via a crossbar switch.

4. The processing unit of claim 2, wherein said master processor and said parallel processors have shared random access memory on said device.

5. The processing unit of claim 1, wherein said master processor is further programmed to distribute said sublists by providing pointers to said sublists.

6. The processing unit of claim 1, further comprising random access memory associated with each of said parallel processors for storing parameters of said display list.

7. The processing unit of claim 1, wherein said display list is comprised of operation codes and parameters, and wherein said operation codes represent programming executable by said parallel processors.

8. A processing unit for a printer, operable to process a graphic description program representing an image to be printed, comprising:
   a master processor for interpreting said graphic description program to build a display list, to partition said display list into a plurality of sublists, each of said sublists representing a different separate band of said image, a band being defined as a strip of a page of predetermined width, and to distribute said sublists to parallel processors such that each of said parallel processors receives a different one of said sublists; and a plurality of parallel processors, said master processor selecting different ones of said parallel processors for receiving different ones of said sublists corresponding to said bands of said image, said selected parallel processors processing said different ones of said sublists simultaneously.

9. The processing unit of claim 8, wherein said master processor and said parallel processors are components of a single multiprocessor device.

10. The processing unit of claim 9, wherein said master processor and said parallel processor are connected via a crossbar switch.

11. The processing unit of claim 9, wherein said master processor and said parallel processors have shared random access memory on said device.

12. The processing unit of claim 8, wherein said master processor is further programmed to distribute said sublists by providing pointers to said sublists.

13. The processing unit of claim 8, further comprising random access memory associated with each of said parallel processors for storing parameters of said display list.

14. The processing unit of claim 8, wherein said display list is comprised of operation codes and parameters, and wherein said operation codes represent instructions executable by said parallel processors.

15. A method of processing a display list, which is a list of operation codes and parameters representing an image to be printed, comprising the steps of:

providing a master processor for partitioning said display list into sublists, each of said sublists representing a separate band of said image, a band being defined as a strip of a page of predetermined width;

providing a plurality of parallel processors, said master processor selecting different ones of said parallel processors and distributing said sublists to said selected parallel processors, each of said parallel processors receiving a different one of said sublists;

executing said sublists corresponding to said bands of said image using said parallel processors operating simultaneously, each said parallel processor being programmed to perform as an interpreter such that said operation codes may be executed; and repeating said distributing and executing steps until all of said sublists of said image have been executed.

16. The method of claim 15, wherein said distributing step is performed by providing pointers to said parallel processors.

17. The method of claim 15, wherein said partitioning step is performed so as to clip parameters of any operation code for an object in more than one sublist.

* * * * *